(12) United States Patent
Koike

(10) Patent No.: US 8,300,982 B2
(45) Date of Patent: Oct. 30, 2012

(54) INFORMATION PROCESSING APPARATUS, INFORMATION PROCESSING METHOD AND INFORMATION PROCESSING PROGRAM

(75) Inventor: Hiroyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 1121 days.

(21) Appl. No.: 12/029,912

(22) Filed: Feb. 12, 2008

(65) Prior Publication Data

US 2008/0219559 A1   Sep. 11, 2008

(30) Foreign Application Priority Data

Mar. 9, 2007  (JP) ................. 2007-060432

(51) Int. Cl.
*G06K 9/36* (2006.01)
*G06K 9/46* (2006.01)
*G06K 9/66* (2006.01)

(52) U.S. Cl. ........ 382/289; 382/190

(58) Field of Classification Search ........... 382/190, 382/217–222, 289, 305
See application file for complete search history.

(56) References Cited

U.S. PATENT DOCUMENTS

| | | | |
|---|---|---|---|
| 6,711,287 B1 * | 3/2004 | Iwasaki | 382/165 |
| 6,914,624 B1 * | 7/2005 | Esquibel et al. | 348/207.99 |
| 7,791,594 B2 * | 9/2010 | Dunko | 345/173 |
| 2003/0169303 A1 * | 9/2003 | Islam et al. | 345/836 |
| 2004/0052430 A1 * | 3/2004 | Albertelli et al. | 382/289 |
| 2004/0098744 A1 | 5/2004 | Gutta | |
| 2005/0120372 A1 * | 6/2005 | Itakura | 725/46 |
| 2006/0020621 A1 * | 1/2006 | Araki et al. | 707/102 |
| 2006/0212882 A1 * | 9/2006 | Foti et al. | 719/330 |
| 2006/0280448 A1 * | 12/2006 | Ohtsuka et al. | 386/95 |
| 2007/0019943 A1 * | 1/2007 | Sueyoshi et al. | 396/287 |
| 2007/0288300 A1 * | 12/2007 | VanDenBogart et al. | 705/10 |
| 2008/0279481 A1 * | 11/2008 | Ando | 382/306 |

FOREIGN PATENT DOCUMENTS

| | | |
|---|---|---|
| JP | 2004-070504 | 3/2004 |
| JP | 2004-110435 | 4/2004 |
| JP | 2005-215922 | 8/2005 |
| JP | 2006-172097 | 6/2006 |
| JP | 2006-227994 | 8/2006 |

* cited by examiner

*Primary Examiner* — Yubin Hung

(74) *Attorney, Agent, or Firm* — Finnegan, Henderson, Farabow, Garrett & Dunner LLP

(57) ABSTRACT

Disclosed herein is an information processing apparatus for carrying out an information registration process to register preference information of a user for an item determined in advance. The information processing apparatus including: image feature quantity extraction means; an object image feature quantity database; an object image preference information database; matching image detection means; and preference information acquisition means.

13 Claims, 7 Drawing Sheets

FIG.5

| IMAGE ID | OBJECT ID | OBJECT IMAGE FEATURE QUANTITIES ||||
|---|---|---|---|---|---|
| | | FEATURE A | FEATURE B | FEATURE C | FEATURE D |
| 1 | 1X | 0.3 | 0.4 | 0.1 | 0.3 |
| 2 | 1X | 0.2 | 0.2 | 0.1 | 0.5 |
| 3 | 2Y | 0.1 | 0.4 | 0.3 | 0.5 |

FIG.6

| IMAGE ID | PREFERENCE INFORMATION |
|---|---|
| 1 | 1 |
| 2 | -1 |
| 3 | 0.3 |

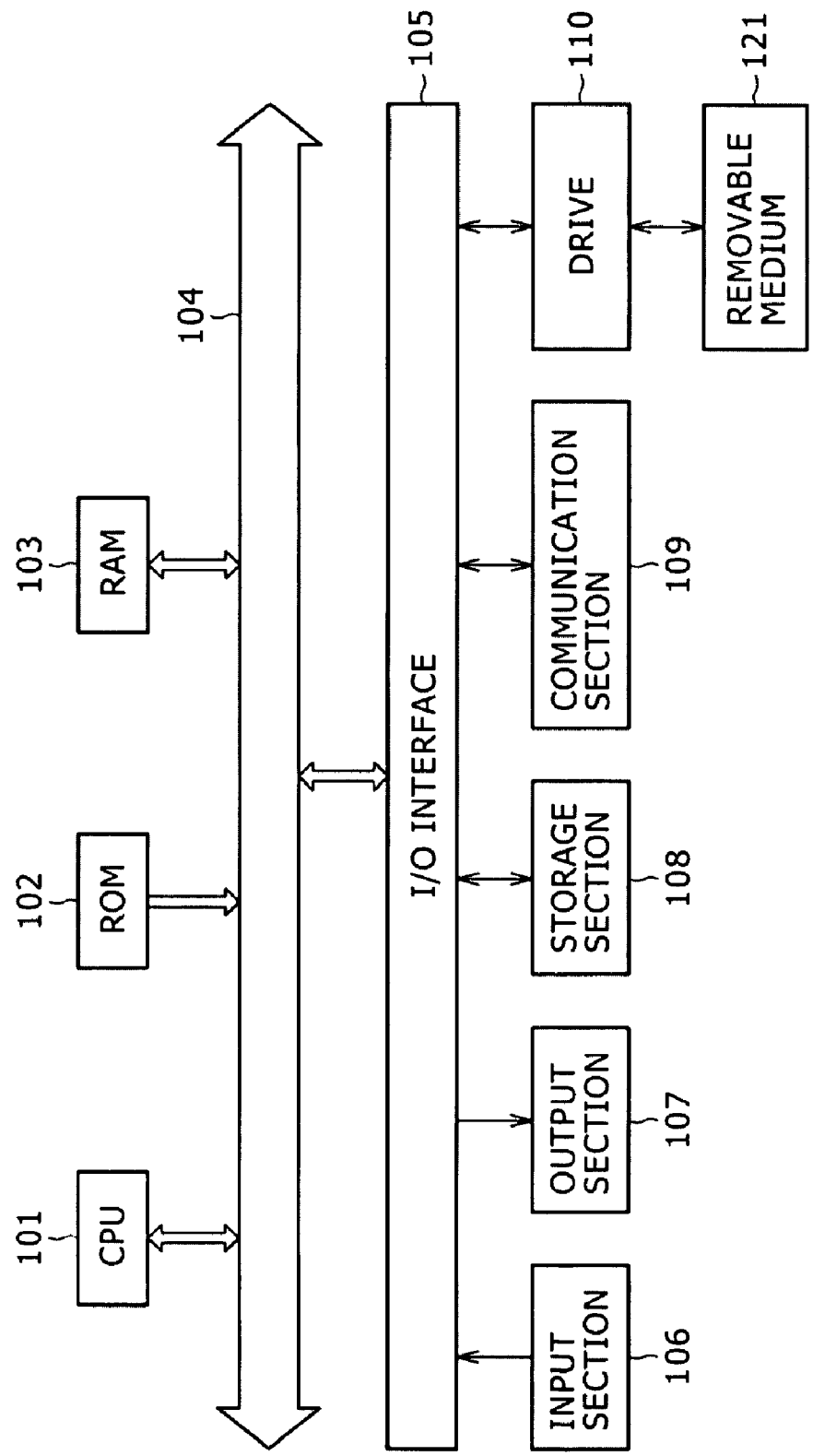

INFORMATION PROCESSING APPARATUS, INFORMATION PROCESSING METHOD AND INFORMATION PROCESSING PROGRAM

CROSS REFERENCES TO RELATED APPLICATIONS

The present invention contains subject matter related to Japanese Patent Application JP 2007-060432 filed with the Japan Patent Office on Mar. 9, 2007, the entire contents of which being incorporated herein by reference.

BACKGROUND OF THE INVENTION

1. Field of the Invention

The present invention relates to an information processing apparatus, an information processing method and an information processing program. More particularly, the present invention relates to an information processing apparatus allowing the user to more easily enter information on a preference with the user to the apparatus in a process to register the information in the apparatus, an information processing method adopted by the apparatus and an information processing program implementing the method.

2. Description of the Related Art

In general, when the user wants to search the Internet or the like for information desired by the user itself for example, the user enters a plurality of keywords each having a strong correlation with the desired information to an information processing apparatus and the apparatus then carries out a search process based on the keywords.

In addition, in recent years, there have been proposed techniques of searching for desired information without entering a keyword. In accordance with an information searching technique described in Japanese Patent Laid-open No. 2005-215922 (referred to as Patent Document 1 hereinafter), instead of entering a keyword, the user enters (or specifies) a picture taken by making use of a photographing function of a hand phone set. In this way, an operation to enter a keyword to the information processing apparatus can be eliminated. As another example, when the user wants to search for information on a specific shoe but the user does not know information related to the shoe, the user may not enter characters composing a keyword for the shoe. Examples of the information related to the shoe are the name of the shoe and the name of a manufacturer producing the shoe. In this case, the user can take a picture of the shoe by making use of a photographing function of a hand phone set and enter the picture to the information processing apparatus in place of the information related to the shoe. In this way, a process can be carried out to search for information on the shoe on the basis of the picture of the shoe.

An operation to enter characters and/or numbers to an information processing apparatus is carried out in a process to register information on a preference with the user in the information processing apparatus. For example, information on a preference with the user can also be registered in a recording/reproduction apparatus for recording and reproducing a TV broadcast program. That is to say, the recording/reproduction apparatus having a function for registering information on a preference with the user records a TV broadcast program on the basis of information registered in advance by the user in the apparatus by entering typically a keyword to the apparatus as information on a TV broadcast program serving as a preference with the user.

SUMMARY OF THE INVENTION

Also when the user carries out an operation to enter characters and/or numbers to the information processing apparatus on a preference with the user in the apparatus, however, the user may feel that the operation to enter such an input is a cumbersome operation.

Addressing the above problem, the present invention allows the user to more easily enter information on a preference with the user to the apparatus in a process to register the information in the apparatus, an information processing method adopted by the apparatus and an information processing program implementing the method.

In accordance with a first embodiment of the present invention, there is provided an information processing apparatus for carrying out an information registration process to register preference information of a user for an item determined in advance in the apparatus. The information processing apparatus employs:

image feature quantity extraction means for extracting a feature quantity of a taken object image of a photographing object determined in advance from the object image;

an object image feature quantity database for storing a feature quantity of each comparison image as a feature quantity to be compared with the feature quantity of the object image by associating the feature quantity of the comparison image with an image ID assigned to the comparison image;

an object image preference information database for storing preference information for each comparison image by associating the preference information with an image ID assigned to the comparison image;

matching image detection means for detecting the image ID of a matching image defined as a comparison image having a feature quantity matching the feature quantity of the object image from the object image feature quantity database; and preference information acquisition means for acquiring preference information associated with the image ID of the matching image from the object image preference information database as the preference information of the user for the item if the image ID of the matching image is detected from the object image feature quantity database and outputting the extracted preference information.

It is possible to design the information processing apparatus into a configuration in which the information processing apparatus further employs:

photographing parameter computation means for computing a photographing parameter used in a photographing operation carried out by the user to take the object image of the photographing object from the object image if the image ID of the matching image is not detected from the object image feature quantity database; and preference information conversion means for converting the photographing parameter computed by the photographing parameter computation section into the preference information of the user for the item and outputting the preference information.

In accordance with the first embodiment of the present invention, there is provided an information processing method for carrying out an information registration process to register preference information of a user for an item determined in advance by making use of an object image feature quantity database for storing a feature quantity of each comparison image as a feature quantity to be compared with the feature quantity of an object image taken from a photographing object determined in advance by associating the feature quantity of the comparison image with an image ID assigned to the comparison image, and an object image preference information database for storing preference information for each comparison image by associating the preference information with an image ID assigned to the comparison image. The information processing method includes the steps of:

extracting a feature quantity of a taken object image of a photographing object determined in advance from the object image;

detecting the image ID of a matching image defined as a comparison image having a feature quantity matching the feature quantity of the object image from the object image feature quantity database; and acquiring preference information associated with the image ID of the matching image from the object image preference information database as the preference information of the user for the item if the image ID of the matching image is detected from the object image feature quantity database and outputting the extracted preference information.

In accordance with the first embodiment of the present invention, there is provided an information processing program to be executed by a computer in order to carry out an information registration process to register preference information of a user for an item determined in advance by making use of an object image feature quantity database for storing a feature quantity of each comparison image as a feature quantity to be compared with the feature quantity of an object image taken from a photographing object determined in advance by associating the feature quantity of the comparison image with an image ID assigned to the comparison image, and an object image preference information database for storing preference information for each comparison image by associating the preference information with an image ID assigned to the comparison image. The information registration process carried out by the computer includes the steps of:

extracting a feature quantity of a taken object image of a photographing object determined in advance from the object image;

detecting the image ID of a matching image defined as a comparison image having a feature quantity matching the feature quantity of the object image from the object image feature quantity database; and acquiring preference information associated with the image ID of the matching image from the object image preference information database as the preference information of the user for the item if the image ID of the matching image is detected from the object image feature quantity database and outputting the extracted preference information.

In accordance with the first embodiment of the present invention, a feature quantity is extracted from an object image of a photographing object determined in advance. Then, the image ID of a matching image defined as a comparison image having a feature quantity matching the feature quantity of the object image is detected from the object image feature quantity database. Subsequently, preference information associated with the image ID of the matching image is acquired from the object image preference information database as the preference information of the user for the item if the image ID of the matching image is detected from the object image feature quantity database. Finally, the acquired preference information is output.

In accordance with a second embodiment of the present invention, there is provided an information processing apparatus for carrying out an information registration process to register preference information of a user for an item determined in advance in the apparatus. The information processing apparatus employs:

photographing parameter computation means for computing a photographing parameter used in a photographing operation carried out by the user to take an object image of a photographing object determined in advance from the object image; and preference information conversion means for converting the photographing parameter computed by the photographing parameter computation section into the preference information of the user for the item and outputting the preference information.

In accordance with the second embodiment of the present invention, there is provided an information processing method for carrying out an information registration process to register preference information of a user for an item determined in advance. The information processing method has the steps of:

computing a photographing parameter used in a photographing operation carried out by the user to take an object image of a photographing object determined in advance from the object image; and converting the computed photographing parameter into the preference information of the user for the item and outputting the resulting preference information.

In accordance with the second embodiment of the present invention, there is provided an information processing program to be executed by a computer in order to carry out an information registration process to register preference information of a user for an item determined in advance. The information registration process carried out by the computer has the steps of:

computing a photographing parameter used in a photographing operation carried out by the user to take an object image of a photographing object determined in advance from the object image; and converting the computed photographing parameter into the preference information of the user for the item and outputting the resulting preference information.

In accordance with the second embodiment of the present invention, a photographing parameter used in an operation carried out by the user to take an object image of a photographing object determined in advance is computed from the object image. Then, the computed photographing parameter is converted into the preference information of the user for the item. Finally, the resulting preference information is output.

The present invention allows a user to more easily enter preference information to an information processing apparatus according to the present embodiment in a process to register the information in the apparatus.

BRIEF DESCRIPTION OF THE DRAWINGS

FIG. 5 shows a table stored in an object image feature quantity DB;

FIG. 6 shows a table stored in an object image preference information DB;

FIG. 8 is a block diagram showing a typical configuration of hardware composing a computer functioning as an information processing apparatus according to the embodiment of the present invention.

DETAILED DESCRIPTION OF THE PREFERRED EMBODIMENTS

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely speaking, an embodiment included in the following comparative description as an embodiment corresponding to a specific invention is not to be interpreted as an embodiment not corresponding to an invention other than the specific invention. In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

Figure 4:
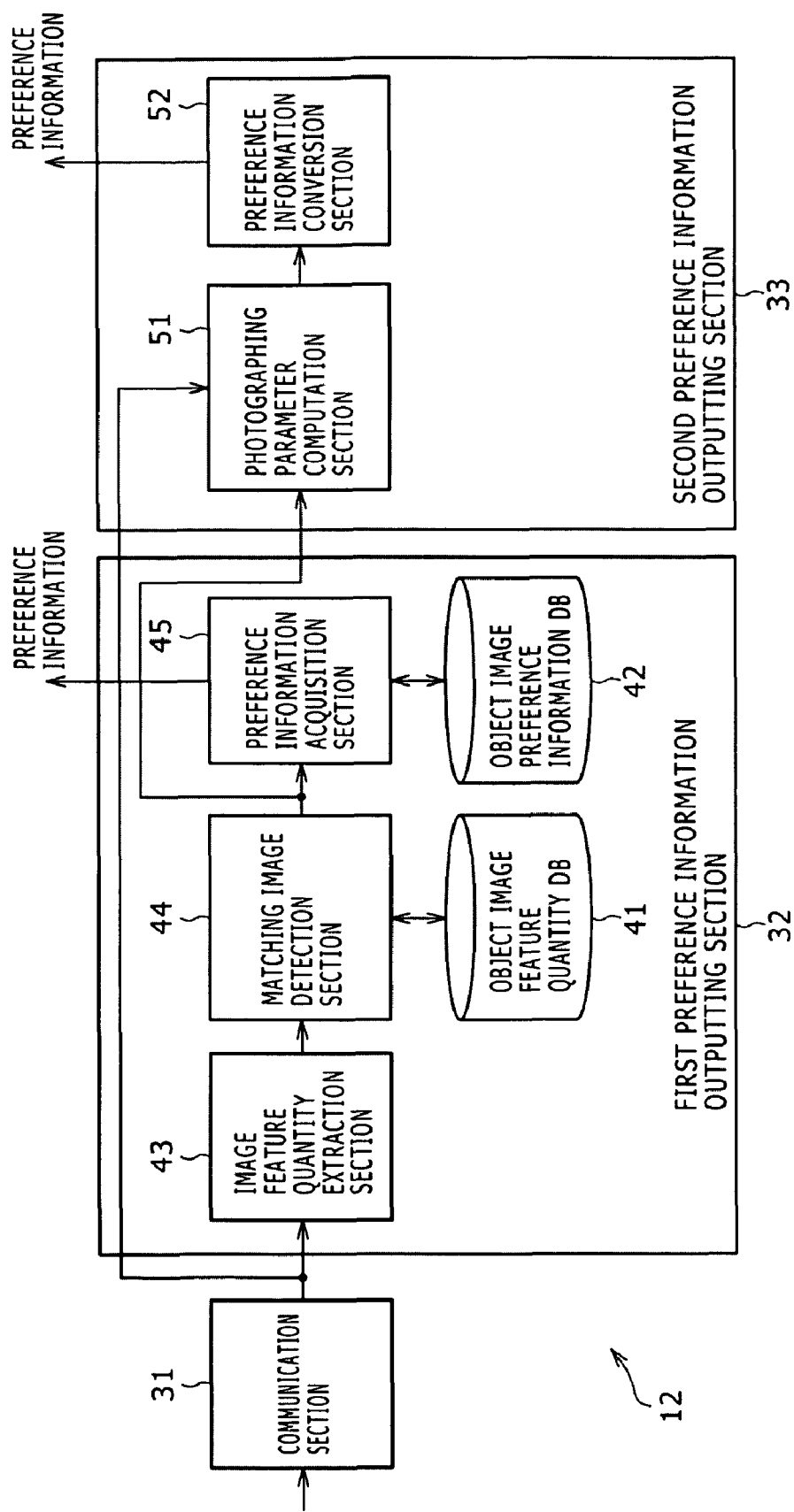
FIG. 4 is a block diagram showing a typical detailed configuration of the preference information determination section.

In accordance with the first embodiment of the present invention, there is provided an information processing apparatus (such as an information processing apparatus 3 shown in FIG. 1) for carrying out an information registration process to register preference information of a user for an item determined in advance in the apparatus. The information processing apparatus employs:

image feature quantity extraction means (such as an image feature quantity extraction section 43 shown in FIG. 4) for extracting a feature quantity of a taken object image of a photographing object determined in advance from the object image;

an object image feature quantity database (such as an object image feature quantity DB 41 shown in FIG. 4) for storing a feature quantity of each comparison image as a feature quantity to be compared with the feature quantity of the object image by associating the feature quantity of the comparison image with an image ID assigned to the comparison image;

an object image preference information database (such as an object image preference information DB 42 shown in FIG. 4) for storing preference information for each comparison image by associating the preference information with an image ID assigned to the comparison image;

matching image detection means (such as a matching image detection section 44 shown in FIG. 4) for detecting the image ID of a matching image defined as a comparison image having a feature quantity matching the feature quantity of the object image from the object image feature quantity database; and preference information acquisition means (such as a preference information acquisition section 45 shown in FIG. 4) for acquiring preference information associated with the image ID of the matching image from the object image preference information database as the preference information of the user for the item if the image ID of the matching image is detected from the object image feature quantity database and configured to output the extracted preference information.

It is possible to provide the information processing apparatus with a configuration in which the information processing apparatus further employs:

photographing parameter computation means (such as a photographing parameter computation section 51 shown in FIG. 4) for computing a photographing parameter used in a photographing operation carried out by the user to take the object image of the photographing object from the object image if the image ID of the matching image is not detected from the object image feature quantity database; and preference information conversion means (such as a preference information conversion section 52 shown in FIG. 4) for converting the photographing parameter computed by the photographing parameter computation section into the preference information of the user for the item and outputting the preference information.

Figure 7:
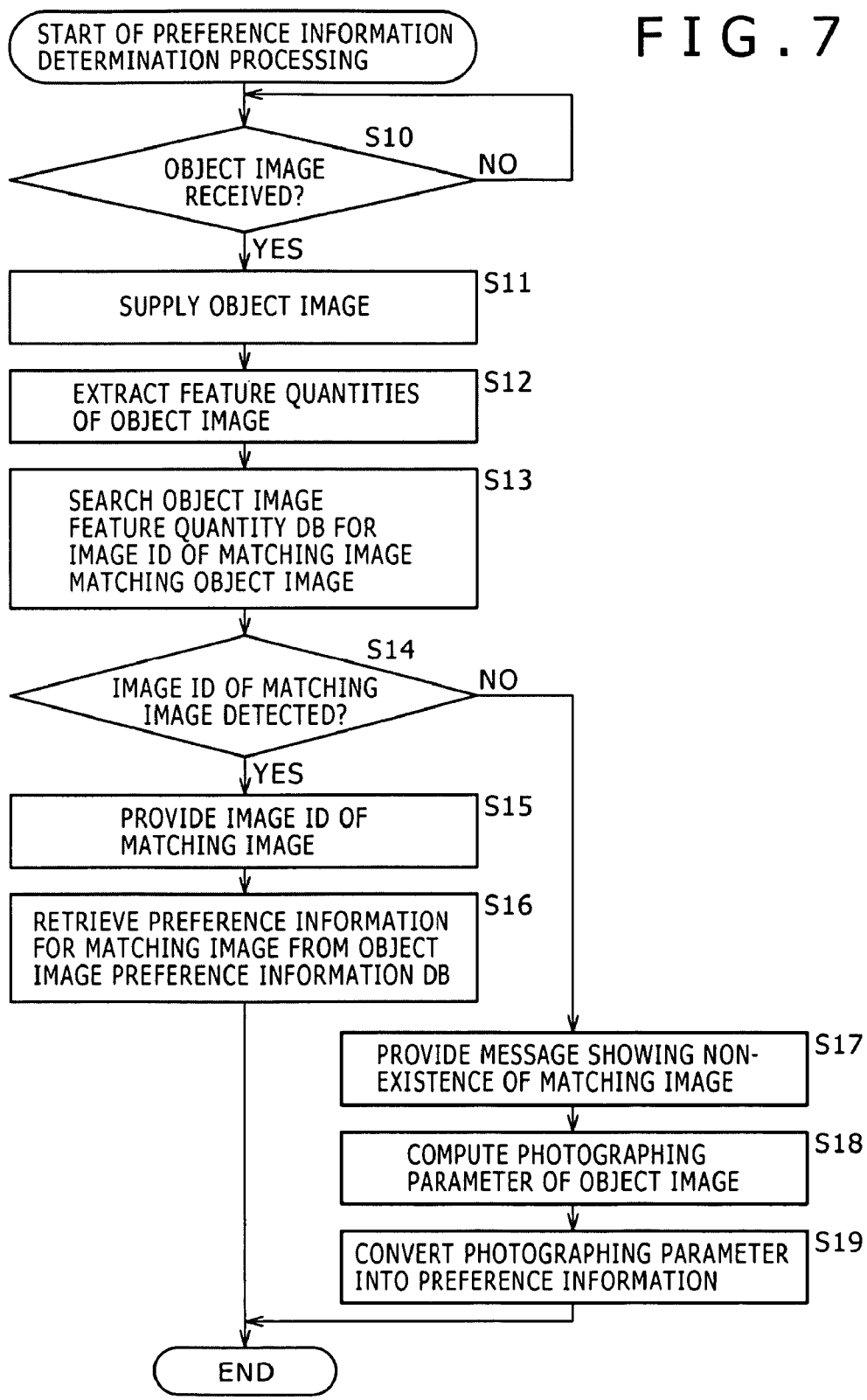
FIG. 7 shows a flowchart representing processing carried out by the preference information determination section.

In accordance with the first embodiment of the present invention, there is provided an information processing method for carrying out an information registration process to register preference information of a user for an item determined in advance by making use of an object image feature quantity database for storing a feature quantity of each comparison image as a feature quantity to be compared with the feature quantity of an object image taken from a photographing object determined in advance by associating the feature quantity of the comparison image with an image ID assigned to the comparison image, and an object image preference information database for storing preference information for each comparison image by associating the preference information with an image ID assigned to the comparison image. The information processing method includes the steps of:

extracting a feature quantity of a taken object image of a photographing object determined in advance from the object image (for example, in a process carried out at a step S12 of a flowchart shown in FIG. 7);

detecting the image ID of a matching image defined as a comparison image having a feature quantity matching the feature quantity of the object image from the object image feature quantity database (for example, in a process carried out at a step S13 of the flowchart shown in FIG. 7); and acquiring preference information associated with the image ID of the matching image from the object image preference information database as the preference information of the user for the item if the image ID of the matching image is detected from the object image feature quantity database and outputting the extracted preference information (for example, in the process carried out at the step S15 of the flowchart shown in FIG. 7).

The embodiments of the present invention are explained by referring to diagrams as follows.

Figure 1:
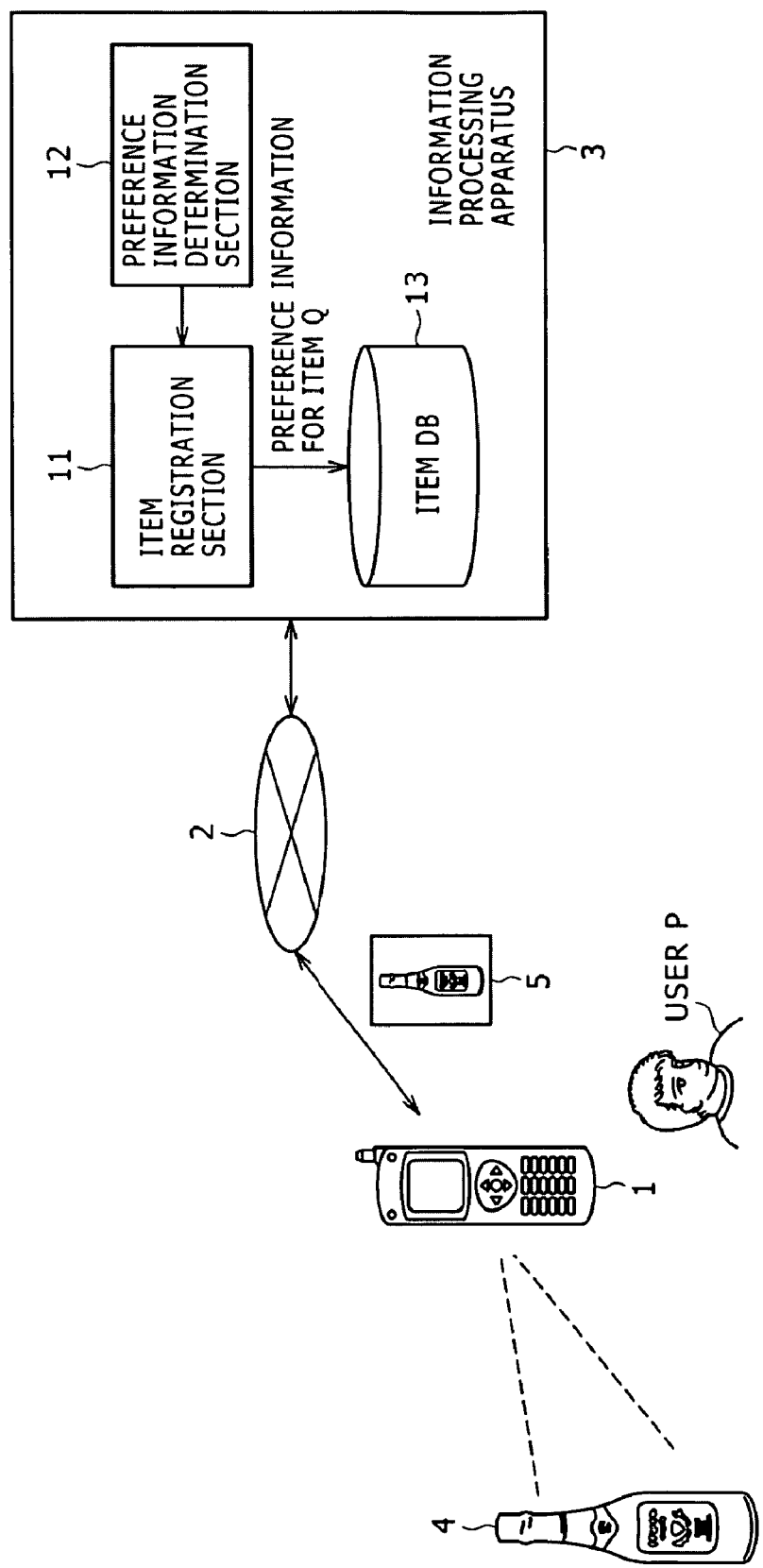
FIG. 1 is a diagram showing a typical configuration of an information processing system according to an embodiment of the present invention.

FIG. 1 is a diagram showing a typical configuration of an information processing system according to an embodiment of the present invention.

The information processing system shown in FIG. 1 includes a hand phone unit 1 having a network-communication function and a photographing function, a network 2 such as an internet or a LAN (Local Area Network) as well as an information processing apparatus 3 for receiving information transmitted by the hand phone unit 1 to the information processing apparatus 3 by way of the network 2.

A user P carries out a photographing operation to take an object image 5 of a photographing object 4 serving as an object of photographing by making use of the hand phone unit 1. The hand phone unit 1 then transmits the data of the object image 5 of the photographing object 4 to the information processing apparatus 3 by way of the network 2. In this embodiment, the photographing object 4 is a wine bottle as shown in FIG. 1.

The information processing apparatus 3 has at least an item registration section 11, a preference information determination section 12 and an item DB (database) 13. The information processing apparatus 3 carries out a preference information registration process to register preference information of the user P for a plurality of items. The items in this specification as a technical term are pieces of software and hardware which are used by the user. Typical pieces of software include a TV broadcast program, a sentence, a motion picture, a picture and a song. In general, the pieces of software are a moving picture, a still picture, a sound and their combination. In the following description, the pieces of software are also referred to as pieces of data. On the other hand, the pieces of hardware include articles such as shoes, cloths and foods. As described above, the preference information of a user for an item represents the degree of preference displayed by the user as preference for the item.

The item registration section 11 is a unit for acquiring preference information of the user P for an item Q from the preference information determination section 12 and storing (registering) the preference information in the item DB 13 by associating the information with the item Q. The preference information determination section 12 is a unit for determining the preference information of the user P for the item Q on the basis of an object image 5 received from the hand phone unit 1 as an image of a photographing object 4 serving as the item Q and supplying the information to the item registration section 11. The item DB 13 is a memory used for receiving an item Q and the preference information of the user P for the item Q from the item registration section 11 and storing the information and the item Q by associating the information with the item Q. The item DB 13 can be used for storing pieces of preference information associated with a number of items for a number of users. For each user, the item DB 13 can be used for storing a plurality of pieces of preference information for the same plurality of items each associated with an aforementioned piece of preference information. In addition, items for a user may be different items for another user. Information stored in the item DB 13 as preference information of a user for an item can be used by the information processing apparatus 3 itself or supplied to another apparatus which will use the preference information.

The following description explains operations carried out by the information processing system shown in FIG. 1 to register preference information of the user P for the item Q in the item DB 13 employed in the information processing apparatus 3. It is to be noted that the user P has already specified the photographing object 4 to serve as the item Q and notified the item registration section 11 of the item Q.

First of all, the user P takes the object image 5 of the photographing object 4 in a photographing operation according to a rule to be explained later by referring to FIGS. 2 and 3. Then, the hand phone unit 1 transmits the data of the object image 5 of the photographing object 4 to the information processing apparatus 3 by way of the network 2.

In the information processing apparatus 3, the object image 5 is supplied to the preference information determination section 12. The preference information determination section 12 determines the preference information of the user P for the photographing object 4 serving as the item Q in accordance with what part of photographing object 4 is seen on the object image 5 or in accordance with the angle formed by the photographing object 4 shown on the object image 5. Then, the preference information determination section 12 supplies the preference information to the item registration section 11.

As described above, the preference information of the user P for the item Q represents the degree of preference displayed by the user P for the item Q. The preference information has a value in the range −1 to 1. The preference information of 1 equal to the maximum value in the range represents the highest degree of preference, indicating that the user likes the item Q or is fond of the item Q. On the other hand, the preference information of −1 equal to the minimum value in the range represents the lowest degree of preference, indicating that the user dislikes the item Q or hates the item Q. The preference information of 0 equal to the middle value of the range represents a mediocre degree of preference, indicating that the user does not know the item Q or neither likes nor dislikes the item Q.

Then, the item registration section 11 stores the preference information received from the preference information determination section 12 in the item DB 13 as the preference information of the user P for the item Q. The item DB 13 associates the stored preference information with the item Q.

Figure 2:
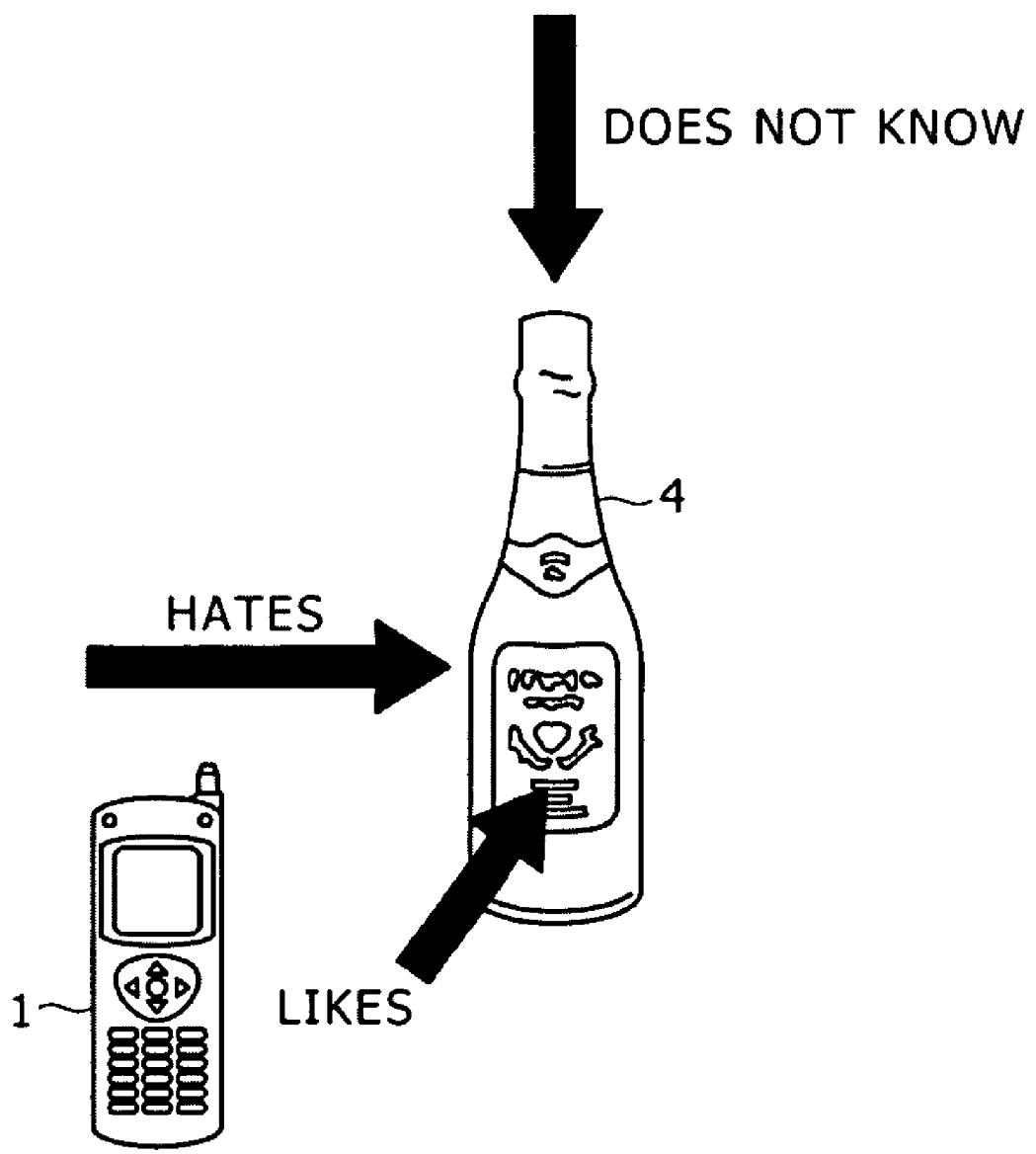
FIG. 2 is an explanatory diagram referred to in description of the first one of preference information determination processes.
Figure 3:
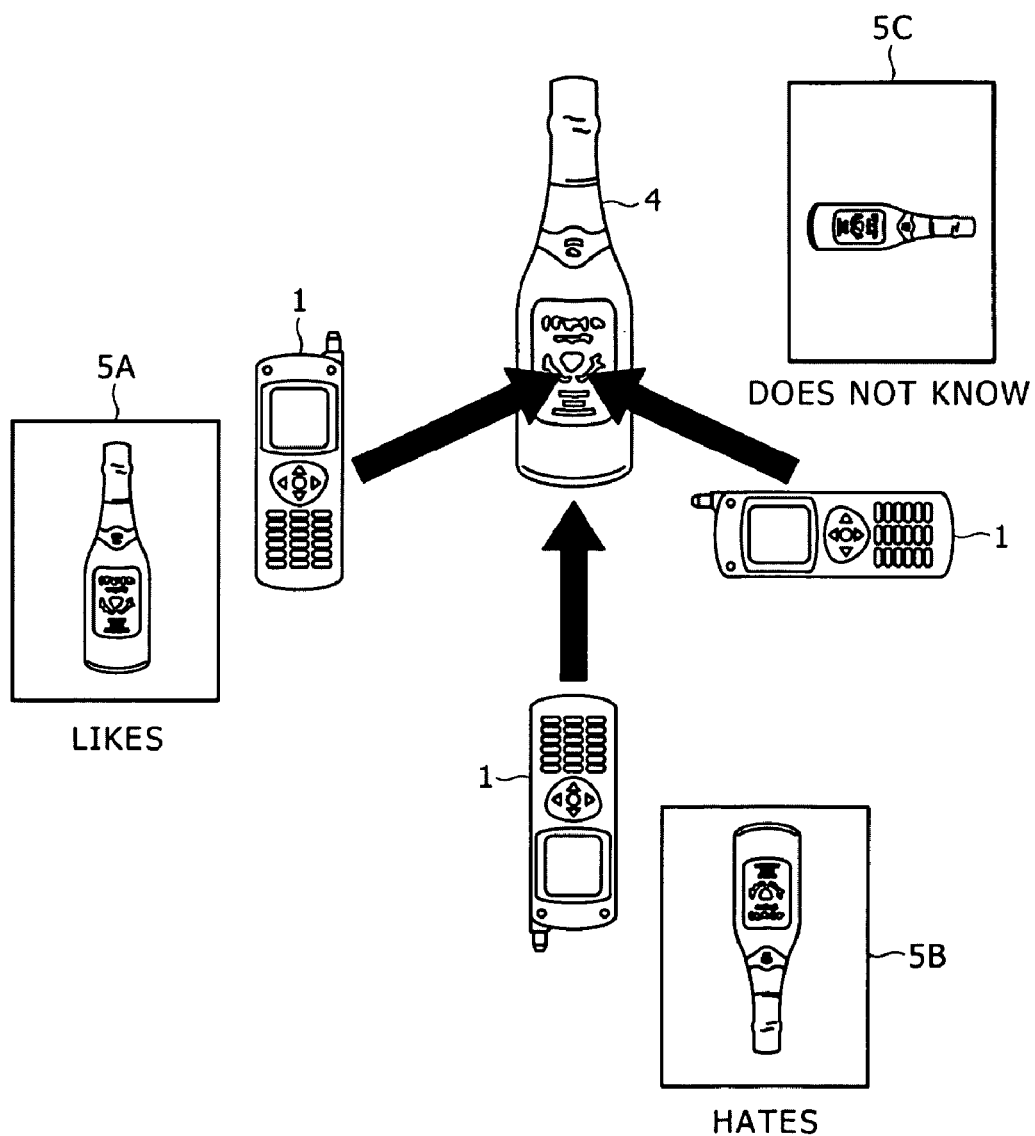
FIG. 3 is an explanatory diagram referred to description of the second one of the preference information determination processes.

By referring to FIGS. 2 and 3, the following description explains processing (preference information determination processes) carried out by the preference information determination section 12 to determine preference information on the basis of an object image 5 photographing by the hand phone unit 1.

FIG. 2 is an explanatory diagram referred to in the following description of the first one of preference information determination processes carried out by the preference information determination section 12.

In the first preference information determination process, preference information is determined in accordance with a direction in which the object image 5 of the photographing object 4 is taken in a photographing operation. In other words, preference information is determined in accordance with what part of the photographing object 4 is seen on the object image 5.

If the user P wants to enter the preference information of 1 for the photographing object 4 to indicate that the user P likes the photographing object 4 for example, the user P makes use of the hand phone unit 1 to take an object image 5 of the photographing object 4, which is a wine bottle erected in the upright direction, in a photographing operation from a position right in front of the bottle, that is, a position facing a label pasted on the bottle. If the user P wants to enter the preference information of −1 for the photographing object 4 to indicate that the user P dislikes the photographing object 4, on the other hand, the user P makes use of the hand phone unit 1 to take an object image 5 of the photographing object 4, which is the wine bottle erected in the upright direction, in a photographing operation from a position facing a side surface of the bottle, that is, a position on the right-hand side or the left-hand side of the bottle having the label pasted on the front surface of the bottle. If the user P wants to enter the preference information of 0 for the photographing object 4 to indicate that the user P does not know the photographing object 4, the user P makes use of the hand phone unit 1 to take an object image 5 of the photographing object 4, which is the wine bottle erected in the upright direction, in a photographing operation from a position right above the bottle.

The preference information determination section 12 has already stored the preference information associated with an image ID assigned to a taken image of the photographing object 4 photographed from a position right in front of the photographing object 4, the preference information associated with an image ID assigned to a taken image of the photographing object 4 photographed from a position facing a side surface of the photographing object 4 and the preference information associated with an image ID assigned to a taken image of the photographing object 4 photographed from a position right above the photographing object 4 in an object image preference information DB 42 by pairing the pieces of preference information with their respective image IDs each assigned to a corresponding taken image in the object image preference information DB 42 by associating the feature quantities with image IDs assigned to their respective comparison images. The preference information determination section 12 extracts the feature quantity of the object image 5 received from the hand phone unit 1 in order to detect a comparison image (hereinafter, referred to as a matching image) on a basis of the extracted feature quantity. Then, the preference information determination section 12 determines the preference information as preference information associated with the image ID of the detected matching image as the preference information of the user P for the item Q, and outputs the preference information to the item registration section 11.

FIG. 3 is an explanatory diagram referred to in the following description of the second one of the preference information determination processes carried out by the preference information determination section 12.

In the second preference information determination process, preference information is determined in accordance with an angle at which an image of the photographing object 4 facing the hand phone unit 1 is taken. That is to say, preference information is determined in accordance with an angle θ formed by the photographing object 4 seen on the object image 5 as an angle corresponding to the preference information. The angle θ formed by the photographing object 4 seen on the object image 5 is an angle by which the photographing object 4 is rotated with the line of sight perpendicular to the front face of the photographing object 4 taken as the rotational axis. The angle θ formed by the photographing object 4 seen on the object image 5 is expressed in terms of radials [rad].

If the user P wants to enter the preference information of 1 for the photographing object 4 in order to indicate that the user P likes the photographing object 4 for example, the user P makes use of the hand phone unit 1 to take an object image 5A of the photographing object 4 representing a wine bottle erected in the upright direction in a photographing operation from a position right in front of the bottle with the bottle erected as it is, that is, a position facing a label pasted on the bottle with the wine pouring mouth of the bottle put on the upper side. In this case, the hand phone unit 1 transmits the object image 5A showing the photographing object 4 forming an angle θ of 0 radial to the preference information determination section 12.

If the user P wants to enter the preference information of −1 in order to indicate that the user P dislikes the photographing object 4, the user P makes use of the hand phone unit 1 to take the photographing object 4 by setting the hand phone unit 1 in an upside-down orientation. In this case, the hand phone unit 1 transmits the object image 5B showing the photographing object 4 forming an angle θ=Π radials (or −Π radials) to the preference information determination section 12. If the user P wants to enter the preference information of 0 in order to indicate that the user P does not know the photographing object 4, the user P makes use of the hand phone unit 1 to take the photographing object 4 representing the wine bottle erected in the upright direction in a photographing operation from a position right in front of the bottle by rotating the hand phone unit 1 by 90 degrees from the orientation taken for the object image 5A. Then, the hand phone unit 1 transmits the object image 5C showing the photographing object 4 forming an angle θ=Π/2 radials (or −Π/2 radials) to the preference information determination section 12.

The preference information determination section 12 extracts the feature quantity of the object image 5 (that is, the object image 5A, the object image 5B or the object image 5C) received from the hand phone unit 1 and determine an angle θ (−Π≦θ≦Π) formed by the photographing object 4 seen on the object image 5. The angle θ can be said to be a photographing parameter used in the photographing operation carried out to take the photographing object 4. The preference information determination section 12 converts the angle θ serving as a photographing parameter into preference information of the user P for the bottle wine serving as the item Q in accordance with a conversion equation of T=1−|2θ|/Π where notation T denotes the preference information whereas notation |2θ| denotes the absolute value of twice the angle θ. Then, the preference information determination section 12 outputs the preference information of the user P for the bottle wine serving as the item Q to the item registration section 11.

As described above, the preference information determination section 12 determines preference information by carrying out the first or second preference information determination process.

FIG. 4 is a block diagram showing a typical detailed configuration of the preference information determination section 12.

As shown in the figure, the preference information determination section 12 employs a communication section 31, a first preference information outputting section 32 and a second preference information outputting section 33. The communication section 31 is a unit for receiving the data of an object image 5 transmitted by the hand phone unit 1 and supplying the data to the first preference information outputting section 32 and the second preference information outputting section 33.

The first preference information outputting section 32 is a unit for carrying the process described earlier by referring to FIG. 2 as the first preference information determination process for determining preference information of the user P for the photographing object 4 serving as the item Q by recognizing a portion seen on the object image 5 as a portion of the photographing object 4, that is, by identifying the feature of the object image 5, and supplying the preference information to the item registration section 11. The second preference information outputting section 33 is a unit for carrying the process described earlier by referring to FIG. 3 as the second preference information determination process for determining preference information of the user P for the photographing object 4 serving as the item Q by recognizing an angle θ formed by the photographing object 4 seen on the object image 5 and supplying the preference information to the item registration section 11.

The first preference information outputting section 32 employs the object image feature quantity DB 41, the object image preference information DB 42, an image feature quantity extraction section 43, a matching image detection section 44 and a preference information acquisition section 45. The second preference information outputting section 33 has a photographing parameter computation section 51 and a preference information conversion section 52.

The object image feature quantity DB 41 is used for storing feature quantities of each of a number of registered object images each registered in advance in the information processing apparatus 3 as a comparison object image to be compared with an object image 5 received from the hand phone unit 1.

FIG. 5 is a diagram showing typical data stored in the object image feature quantity DB 41 as feature quantities of every registered object image.

As shown in FIG. 5, the object image feature quantity DB 41 is used for storing feature quantities of every registered object image of a photographing object by associating the feature quantities with an image ID used for identifying the object image and an object ID used for identifying the photographing object.

For example, in the diagram of FIG. 5, a feature quantity A of 0.3, a feature quantity B of 0.4, a feature quantity C of 0.1 and a feature quantity D of 0.3, which are stored for an object image of a photographing object, are associated with an image ID of 1 assigned to the object image and an object ID of 1X assigned to the photographing object.

As another example, a feature quantity A of 0.2, a feature quantity B of 0.2, a feature quantity C of 0.1 and a feature quantity D of 0.5, which are stored for an object image of a photographing object, are associated with an image ID of 2 assigned to the photographing object image and an object ID of 1X assigned to the object.

As a further example, a feature quantity A of 0.1, a feature quantity B of 0.4, a feature quantity C of 0.3 and a feature quantity D of 0.5, which are stored for an object image of a photographing object, are associated with an image ID of 3 assigned to the object image and an object ID of 2Y assigned to the photographing object.

For example, in the diagram of FIG. 5, the object ID of 1X is an object ID assigned to a wine bottle and the image ID of 1 is an image ID assigned to a registered object image obtained as a result of a photographing operation carried out in order to take an image of the wine bottle from a position right in front of the front face of the bottle whereas the image ID of 2 is an image ID assigned to a registered object image obtained as a result of a photographing operation carried out in order to take an image of the wine bottle from a position facing a side surface of the bottle. Also, the object ID of 2Y is a photographing object other than the wine bottle.

As described above, feature quantities of a registered object image are four feature quantities, i.e., feature quantities A, B, C and D. That is to say, feature quantities of a registered object image can be handled as a feature vector having four components. It is to be noted that the number of components composing a feature vector can be a number greater than four or a number in the range one to three.

FIG. 6 is a diagram showing the structure of data representing pieces of preference information stored in the object image preference information DB 42 employed in the first preference information outputting section 32. The figure is a table showing stored pieces of preference information each associated with an image ID assigned to a registered object image of a photographing object for which the piece of preference information is provided. In FIG. 6, the preference information of 1 is stored in the object image preference information DB 42 by associating the preference information of 1 with the image ID of 1. By the same token, the preference information of −1 is stored in the object image preference information DB 42 by associating the preference information of −1 with the image ID of 2 whereas the preference information of 0.3 is stored in the object image preference information DB 42 by associating the preference information of 0.3 with the image ID of 3.

Returning to FIG. 4, the image feature quantity extraction section 43 extracts feature quantities A, B, C and D of an object image 5 received from the communication section 31 and supplies the four extracted feature quantities to the matching image detection section 44 as a feature vector mentioned above.

The feature quantities extracted by the image feature quantity extraction section 43 from the object image 5 are typically a feature vector or a histogram. The feature quantities include information on colors based on the RGB or CIELAB system, information on the shape and frequency components. It is to be noted that no method for extracting feature quantities from the object image 5 is specified in particular. That is to say, any method for extracting feature quantities from the object image 5 can be adopted as long as the method can be used to extract feature quantities of the same type as the feature quantities stored in the object image feature quantity DB 41 as the feature quantities of registered object images.

The matching image detection section 44 detects an image ID among those stored in the object image feature quantity DB 41 as an image ID assigned to a matching image, that is, a registered object image having feature quantities matching the feature quantities received from the image feature quantity extraction section 43 as the feature quantities of the object image 5. To put it more concretely, the matching image detection section 44 computes the degree of similarity between the feature quantities received from the image feature quantity extraction section 43 and the feature quantities stored in the object image feature quantity DB 41. Then, the matching image detection section 44 detects an image ID as an image ID of the matching image matching the object image 5, which is a registered object image having a computed similarity degree not exceeding a prescribed value $\epsilon$ determined in advance.

For example, the degree of similarity is expressed in terms of a cosine distance ($\cos \theta$) where notation $\theta$ denotes an angle formed by the feature vector of the object image 5 and the feature vector of the registered object image. The cosine distance $\cos \theta$ is a quotient obtained as a result of dividing the inner product of the two feature vectors by the product of the absolute values of the vectors. A registered object image having a degree of similarity to the object image 5 not exceeding the prescribed value $\epsilon$ is an image showing a portion similar to a photographed portion seen on the object image 5 as a portion of the photographing object 4. If there are a plurality of registered object images each having a degree of similarity to the object image 5 not exceeding the prescribed value $\epsilon$, a registered object image having the highest degree of similarity to the object image 5 is taken as the matching image.

The matching image detection section 44 provides the preference information acquisition section 45 and the photographing parameter computation section 51 with a message showing the existence or non-existence of a matching image. To put it more concretely, if the image ID of a matching image is detected among those stored in the object image feature quantity DB 41, the matching image detection section 44 provides the preference information acquisition section 45 and the photographing parameter computation section 51 with the detected image ID of a matching image as a message showing the existence of the matching image. If the image ID of a matching image is not detected, on the other hand, the matching image detection section 44 provides the preference information acquisition section 45 and the photographing parameter computation section 51 with a message showing the non-existence of a matching image in order to notify the preference information acquisition section 45 and the photographing parameter computation section 51 that the image ID of a matching image is not detected among those stored in the object image feature quantity DB 41.

If the matching image detection section 44 provides the preference information acquisition section 45 with the image ID of a matching image as a message showing the existence of the matching image in order to notify the preference information acquisition section 45 that the image ID of a matching image is detected, the preference information acquisition section 45 retrieves preference information associated with the image ID supplied by the matching image detection section 44 from the object image preference information DB 42 and gives the retrieved preference information to the item registration section 11. If the matching image detection section 44 provides the preference information acquisition section 45 with a message showing the non-existence of a matching image to notify the preference information acquisition section 45 that the image ID of a matching image is not detected, on the other hand, the preference information acquisition section 45 does not carry out any process in particular.

If the matching image detection section 44 provides the photographing parameter computation section 51 employed in the second preference information outputting section 33 with the image ID of a matching image, the photographing parameter computation section 51 does not carry out any process in particular. If the matching image detection section 44 provides the photographing parameter computation section 51 with a message showing the non-existence of a matching image, on the other hand, the photographing parameter computation section 51 extracts the feature quantities of the object image 5 received from the communication section 31 and makes use of the feature quantities in a process to compute the angle $\theta$ of the photographing object 4 seen on the object image 5 as a photographing parameter. It is to be noted that no method for extracting feature quantities from the object image 5 is specified in particular. That is to say, any proper method for extracting feature quantities from the object image 5 can be adopted as long as the method can be used properly to compute the angle $\theta$ of the photographing object 4. The photographing parameter computation section 51 supplies the computed photographing parameter to the preference information conversion section 52.

The preference information conversion section 52 converts the angle $\theta$ serving as a photographing parameter into preference information in accordance with a conversion equation of $T=1-|2\theta|/\Pi$ where notation T denotes the preference information. Thus, the preference information T obtained as a result of the conversion process has a value in a range between an upper limit of 1 representing the highest degree of fondness and a lower limit of −1 representing the highest degree of hatred. Then, the preference information conversion section 52 outputs the converted preference information to the item registration section 11.

By referring to a flowchart shown in FIG. 7, the following description explains processing carried out by the preference information determination section 12 to determine preference information.

As shown in the figure, the flowchart begins with a step S10 at which the communication section 31 produces a result of determination as to whether or not an object image 5 is received from the hand phone unit 1, that is, whether or not the hand phone unit 1 has transmitted an object image 5 to the information processing apparatus 3 by way of the network 2. In the step S10, the determination process of the step S10 is carried out repeatedly in a state of waiting for an object image 5 to be transmitted by the hand phone unit 1 to the information processing apparatus 3 by way of the network 2.

As the determination result produced in the process carried out at the step S10 indicates that an object image 5 is received from the hand phone unit 1, that is, as the result of the determination indicates that the hand phone unit 1 has transmitted an object image 5 to the information processing apparatus 3 by way of the network 2, the flow of the processing represented by this flowchart goes on to a step S11 at which the communication section 31 receives the data of the object image 5 transmitted by the hand phone unit 1, supplying the data to the image feature quantity extraction section 43 employed in the first preference information outputting section 32 and the photographing parameter computation section 51 employed in the second preference information outputting section 33.

Then, at the next step S12, the image feature quantity extraction section 43 extracts feature quantities of the object image 5 received from the communication section 31 and supplies a feature vector representing the extracted feature quantities to the matching image detection section 44.

At the next step S13, the matching image detection section 44 detects (searches) the object image feature quantity DB 41 for the image ID of a matching image matching the object image 5. To put it in detail, the matching image detection section 44 computes the degree of similarity between the feature vector received from the image feature quantity extraction section 43 as the feature vector of the object image 5 and every feature vector stored in the object image feature quantity DB 41 as the feature vector of every registered object image, detecting the image ID of each registered object image having a similarity degree not exceeding the prescribed value $\epsilon$.

Then, at the next step S14, the matching image detection section 44 produces a result of determination as to whether or not the image ID of any matching image is detected among those stored in the object image feature quantity DB 41, that is, whether or not the image ID of any registered object image having a similarity degree not exceeding the prescribed value $\epsilon$ is detected among those stored in the object image feature quantity DB 41. As described above, the similarity degree of a registered object image is the degree of similarity between the feature vector received from the image feature quantity extraction section 43 as the feature vector of the object image 5 and a feature vector stored in the object image feature quantity DB 41 as the feature vector of a registered object image.

If the determination result produced in the process carried out at the step S14 indicates that the image ID of a matching image is detected among those stored in the object image feature quantity DB 41, the flow of the processing represented by this flowchart goes on to a step S15 at which the matching image detection section 44 provides the preference information acquisition section 45 and the photographing parameter computation section 51 with the detected image ID of the matching image as a message showing the existence of the matching image.

Then, at the next step S16, the preference information acquisition section 45 retrieves preference information associated with the image ID supplied by the matching image detection section 44 from the object image preference information DB 42. Subsequently, the preference information acquisition section 45 gives the retrieved preference information to the item registration section 11 as the preference information of the user P for the photographing object 4 serving as the item Q. Finally, the execution of the processing represented by this flowchart is ended.

If the determination result produced in the process carried out at the step S14 indicates that the image ID of a matching image is not detected among those stored in the object image feature quantity DB 41, on the other hand, the flow of the processing represented by this flowchart goes on to a step S17 at which the matching image detection section 44 provides the preference information acquisition section 45 and the photographing parameter computation section 51 with a message showing non-existence of a matching image.

After the matching image detection section 44 provides the photographing parameter computation section 51 with a message showing the non-existence of a matching image, the flow of the processing represented by this flowchart goes on to a step S18 at which the photographing parameter computation section 51 computes the angle θ of the photographing object 4 seen on the object image 5 as a photographing parameter. As described earlier, the photographing parameter represented by the angle θ of the photographing object 4 seen on the object image 5 is an inclination (or rotation) relative angle formed by the photographing object 4 on the object image 5 as a result of an inclination (or a rotation) made by the hand phone unit 1 used in a photographing operation to take an object image of an erected photographing object such as a wine bottle from a position facing the front face of the photographing object. The photographing parameter computation section 51 supplies the computed photographing parameter to the preference information conversion section 52.

Then, at the next step S19, the preference information conversion section 52 converts the angle θ received from the photographing parameter computation section 51 as a photographing parameter into preference information in accordance with a conversion equation of T=1−|2θ|/Π. Then, the preference information conversion section 52 supplies (or outputs) the preference information to the item registration section 11 as the preference information of the user P for the photographing object 4 serving as the item Q.

As described above, according to the processing carried out to determine preference information in accordance with the flowchart shown in FIG. 7, if the object image feature quantity DB 41 includes the image ID of a registered object image (also referred to as a comparison image) with feature quantities matching the feature quantities of an object image 5 transmitted from the hand phone unit 1 of the user P to the information processing apparatus 3 by way of the network 2, that is, if the object image feature quantity DB 41 includes the image ID of a registered object image obtained in advance as a result of a photographing operation carried out to take an image of the same photographing object as the photographing object 4 in the same photographing direction as the photographing direction of a photographing operation carried out to take the object image 5, the preference information set in advance for the registered object image is output as the preference information of the user P for the photographing object 4 serving as the item Q.

If the object image feature quantity DB 41 does not include the image ID of a registered object image with feature quantities matching the feature quantities of an object image 5, on the other hand, the preference information conversion section 52 converts the angle θ of the photographing object 4 seen on the object image 5 into preference information and supplies (or outputs) the preference information to the item registration section 11 as the preference information of the user P for the photographing object 4 serving as the item Q.

Thus, when the user P wants to add preference information of the user P for an item Q, the user P does not have to take the trouble to enter a string of characters such as 'like' or 'hate' or a number such as 0.3 or −1. Instead, the user can enter the preference information by simply carrying out a sensuous operation.

In the processing to determine preference information as described above, if preference information may not be output in accordance with the first processing carried out by the first preference information outputting section 32 to determine preference information, the second processing is carried out by the second preference information outputting section 33 to determine preference information. It is also possible to implement a configuration in which the first processing and the second processing are carried out and either of them is output to the item registration section 11 as preference information of the user for an item on a priority basis determined in advance. As another alternative, it is also possible to implement a configuration in which either only the first processing is carried out or only the second processing is carried out to determine preference information.

In addition, in the second processing carried out by the second preference information outputting section 33 in order to determine preference information, the angle θ formed by the photographing object 4 on the object image 5 is converted into a real number in the range −1 to +1 and the resulting real number is output to the item registration section 11 as the preference information of the user for an item. It is also possible to implement a configuration in which, in place of such a real number, one of the integers −1, 0 and 1 used in the first processing carried out by the first preference information outputting section 32 is output to the item registration section 11 as preference information of the user for an item. For example, in this case, the preference information conversion section 52 adopts the following equation.

$$T = \begin{cases} 1 & \left(-\frac{\pi}{4} \leq \theta \leq \frac{\pi}{4}\right) \\ 0 & \left(-\frac{3}{4}\pi \leq \theta < -\frac{\pi}{4}, \frac{\pi}{4} < \theta \leq \frac{3}{4}\pi\right) \\ -1 & \left(-\pi \leq \theta < -\frac{3}{4}\pi, \frac{3}{4}\pi < \theta \leq \pi\right) \end{cases} \quad \text{[Equation 1]}$$

It is to be noted that the angle segments allocated to the integers −1, 0 and 1 as the ranges of the values of the angle θ are by no means limited to the segments specified in the above conversion equation. Also, other angle segments can be added to the three angle segments allocated to the integers −1, 0 and 1.

In addition, in the second processing, the angle θ formed by the photographing object 4 on the object image 5 is used as a photographing parameter. However, the photographing parameter can be a quantity other than the angle θ formed by the photographing object 4 on the object image 5. For example, preference information of the user P for the photographing object 4 serving as the item Q can be found from an approaching degree, which is defined as the degree to which the user P approaches the photographing object 4 in a photographing operation to take the object image 5 of the photographing object 4.

As a measure of the approaching degree to which the user P approaches the photographing object 4 in a photographing operation, a distance 'dist' (>0) to the photographing object 4 can be taken. In this case, the photographing parameter computation section 51 computes the distance 'dist' to the photographing object 4 in the photographing operation from the object image 5 received from the communication section 31 and, then, the preference information conversion section 52 converts the distance 'dist' into preference information in accordance with the following equation.

$$T = \begin{cases} 1 & (dist < minDist) \\ 1 - \dfrac{2(dist - minDist)}{(maxDist - minDist)} & (minDist \leq dist \leq maxDist) \\ -1 & (dist > maxDist) \end{cases} \quad \text{[Equation 2]}$$

In the above equation, notations minDist and maxDist (maxDist>minDist) each denote a constant determined in advance.

In addition, as another measure of the approaching degree to which the user P approaches the photographing object 4, a photographing size 'size' (>0) of the photographing object 4 can be used. In this case, the photographing parameter computation section 51 computes the photographing size 'size' of the photographing object 4 in the photographing operation and, then, the preference information conversion section 52 converts the photographing size 'size' into preference information in accordance with the following equation.

$$T = \begin{cases} 1 & (size > maxSize) \\ -1 + \dfrac{2(size - minSize)}{(maxSize - minSize)} & (minSize \leq size \leq maxSize) \\ -1 & (size < minSize) \end{cases} \quad \text{[Equation 3]}$$

In the above equation, notations minSize and maxSize (maxSize>minSize) each denote a constant determined in advance.

As described above, a variety of quantities that can be recognized from the object image 5 can be taken as a photographing parameter. In addition, it is also possible to express each of the feature quantity and the preference information for example in terms of a combination of one or more probability variables.

The series of processes described previously can be carried out by hardware and/or execution of software. If the series of processes described above is carried out by execution of software, programs composing the software can be installed into a computer embedded in dedicated hardware, a general-purpose personal computer or the like from a program recording medium. A general-purpose personal computer is a personal computer, which can be made capable of carrying out a variety of functions by installing a variety of programs into the personal computer.

FIG. 8 is a block diagram showing a typical configuration of hardware composing the computer for executing the programs in order to carry out the series of processes described previously.

The CPU (Central Processing Unit) 101, the ROM (Read Only Memory) 102 and the RAM (Random Access Memory) 103 are connected to each other by a bus 104.

The bus 104 is also connected to an input/output interface 105. The input/output interface 105 is connected to an input section 106, an output section 107, the storage section 108, a communication section 109 and a drive 110. The input section 106 includes a keyboard, a mouse and a microphone. The output section 107 includes a display unit and a speaker. The storage section 108 includes a hard disk and a nonvolatile memory. The communication section 109 is composed of a network interface or the like. The drive 110 includes the removable medium. The removable medium can be a magnetic disk, an optical disk, a magneto-optical disk or a semiconductor memory.

As explained earlier, the CPU 101 employed in the computer having the hardware configuration described above carries out the series of processes by execution of programs loaded from the storage section 108 into the RAM 103 by way of the input/output interface 105 and the bus 104.

The program executed by a computer (CPU 101) is, for example, recorded into a removable medium 121 which is a package medium composed of the magnetic disk such as a flexible disk, the optical disk such as a CD-ROM (Compact Disk-Read Only Memory) or a DVD (Digital Versatile Disk), the magneto-optical disk as well as the semiconductor memory. As another alternative, the programs are provided through radio or wire transmission media such as a local area network, the Internet or a digital broadcasting satellite.

The programs are installed into the storage medium 108 from the removable medium 121 by way of the input/output interface 105 when the removable medium 121 is mounted onto the drive 110. Also, the programs through radio or wire transmission media are received by the communication section 109 to be installed into the storage section 108. The programs can also be installed in advance in an embedded recording medium such as the storage section 108 and the ROM 102.

It is to be noted that a program to be executed by a computer can be a program to be executed in order to carry out processes sequentially in accordance with the order explained earlier as a flowchart in this specification along the time axis. As an alternative, a program can also be a program to be executed in order to carry out processes concurrently with a necessary timing such as a requested timing.

In accordance with the embodiment described above, the hand phone unit 1 carries out the processing to take an image of a photographing object in a photographing operation as an object image to be used for determining preference information of the user for an item determined in advance whereas the information processing apparatus 3 working as an apparatus physically separated from the hand phone unit 1 carries out the processing to determine the preference information from the object image. However, it is possible to provide a configuration in which only the hand phone unit 1 or only the information processing apparatus 3 carries out both the processing to take an object image and the processing to determine preference information from the object image.

For example, it is possible to provide a configuration in which the hand phone unit 1 carries out the processing to determine preference information from an object image in addition to the processing to take the object image in a photographing operation. In such a configuration, the item DB 13, the object image feature quantity DB 41 and the object image preference information DB 42 correspond to, for example, a recording medium embedded in the hand phone unit 1 or a recording medium mountable onto a drive not shown in the figure as well as removable from the drive. An example of the recording medium mountable onto the drive as well as removable from the drive is a semiconductor memory. In this case, each item stored in the item DB 13 and preference information of the user for the item can be used in other processing carried out by the hand phone unit 1. In addition, the hand phone unit 1 is capable of transmitting (or providing) each item stored in the item DB 13 and preference information for the item to another apparatus.

It is also worth noting that, in this specification, steps of the flowchart described above can be carried out not only in a pre-prescribed order along the time axis, but also concurrently or individually.

It is also to be noted that the technical term 'system' used in this specification implies the configuration of a confluence including a plurality of apparatus.

It is also worth noting that implementations of the present invention are by no means limited to the embodiment described above. That is to say that the embodiment can be changed to any modified version as long as the versions fall within a range not deviating from essentials of the present invention.

In addition, it should be understood by those skilled in the art that a variety of modifications, combinations, sub-combinations and alterations may occur, depending on design requirements and other factors insofar as they are within the scope of the appended claims or the equivalents thereof.

What is claimed is:

1. An information processing method, comprising:
   extracting a feature quantity from an image of an object;
   accessing information associated with a plurality of comparison images, the information comprising identifiers assigned to the comparison images, feature quantities corresponding to the comparison images, and preference information associated with the comparison images;
   determining whether the feature quantity of the object image matches a feature quantity of one of the comparison images;
   obtaining preference information associated with the image identifier assigned to the corresponding one of the comparison images, when the feature quantities of the object image and the corresponding comparison image match, the preference information comprising a value indicative of a preference of a user for the object, and the value being determined based on an orientation of the object within the image; and
   outputting the obtained preference information.

2. An information processing apparatus, comprising:
   a storage device; and
   at least one processor coupled to the storage device, wherein the storage device stores a program for controlling the at least one processor, and wherein the at least one processor, being operative with the program, is configured to:
      extract a feature quantity from an image of an object;
      obtain feature quantities for a plurality of comparison images, the comparison images being associated with corresponding image identifiers;
      determine whether the feature quantity of the object image matches a feature quantity of one of the comparison images;
      obtain preference information associated with the image identifier assigned to the corresponding one of the comparison images, when the feature quantities of the object image and the corresponding comparison image match, the preference information comprising a value indicative of a preference of a user for the object, and the value being determined based on an orientation of the object within the image; and
      output the obtained preference information.

3. The information processing apparatus of claim 2, wherein the at least one processor is further configured to:
   compute a photographing parameter used in a photographing operation carried out by the user to capture the object image, when the feature quantities of the object image and the comparison images fail to match; and
   convert the photographing parameter into the preference information of the object image.

4. The information processing apparatus of claim 3, wherein the photographing parameter comprises an angle formed by the photographic object on the object image.

5. The information processing apparatus of claim 3, wherein the photographing parameter comprises a degree to which the user approaches the photographing object in the photographing operation.

6. The apparatus of claim 2, wherein the at least one processor is further configured to store at least the feature quantities of the comparison images within an object image feature quantity database, the comparison images being associated with corresponding image identifiers.

7. The apparatus of claim 2, wherein the at least one processor is further configured to store the preference information for the comparison images within an object image preference information, the preference information being associated with corresponding ones of the image identifiers of the comparison images.

8. A tangible, non-transitory computer-readable medium storing instructions that, when executed by at least one processor, cause the at least one processor to perform an information processing method, the method comprising the steps of:
   extracting a feature quantity from an image of an object;
   accessing information associated with a plurality of comparison images, the information comprising identifiers assigned to the comparison images, feature quantities corresponding to the comparison images, and preference information associated with the comparison images;
   determining whether the feature quantity of the object image matches a feature quantity of one of the comparison images;
   obtaining preference information associated with the image identifier assigned to the corresponding one of the comparison images, when the feature quantities of the object image and the corresponding comparison image match, the preference information comprising a value indicative of a preference of a user for the object, and the value being determined based on an orientation of the object within the image; and
   outputting the obtained preference information.

9. An information processing method, comprising:
   computing a photographing parameter used in a photographing operation carried out by a user to capture an image of a photographing object determined in advance from said object image, the photographing parameter being indicative of an orientation of the photographing object within the object image;
   generating, based on the computed photographing parameter, preference information comprising a value indicative of a preference of the user for the photographing object; and
   outputting the preference information.

10. An information processing apparatus, comprising:
    a storage device; and
    at least one processor coupled to the storage device, wherein the storage device stores a program for controlling the at least one processor, and wherein the at least one processor, being operative with the program, is configured to:
       compute a photographing parameter used in a photographing operation carried out by a user to capture an image of a photographing object determined in advance from said object image, the photographing parameter being indicative of an orientation of the photographing object within the object image; and generate, based on the photographing parameter, preference information comprising a value indicative of a preference of the user for the photographing object; and output the preference information.

11. The information processing apparatus of claim 10, wherein the photographing parameter comprises an angle formed by the photographic object on the object image.

12. The information processing apparatus of claim 10, wherein the photographing parameter comprises a degree to which the user approaches the photographing object in the photographing operation.

13. A tangible, non-transitory computer-readable medium storing instruction that, when executed by at least one processor, cause the at least one processor to perform an information processing method, comprising the steps of:

computing a photographing parameter used in a photographing operation carried out by a user to capture an image of a photographing object determined in advance from said object image, the photographing parameter being indicative of an orientation of the photographing object within the object image;

generating, based on the computed photographing parameter, preference information comprising a value indicative of a preference of the user for the photographing object; and outputting the preference information.

* * * * *